(12) United States Patent
Armstrong et al.

(10) Patent No.: US 8,517,095 B2
(45) Date of Patent: Aug. 27, 2013

(54) METHOD OF USING HEXOSE OXIDASES TO CREATE HYDROGEN PEROXIDE IN AQUEOUS WELL TREATMENT FLUIDS

(75) Inventors: Charles David Armstrong, Tomball, TX (US); Qi Qu, Spring, TX (US)

(73) Assignee: Baker Hughes Incorporated, Houston, TX (US)

( * ) Notice: Subject to any disclaimer, the term of this patent is extended or adjusted under 35 U.S.C. 154(b) by 381 days.

(21) Appl. No.: 12/852,915

(22) Filed: Aug. 9, 2010

(65) Prior Publication Data

US 2012/0031618 A1    Feb. 9, 2012

(51) Int. Cl.
*E21B 47/00*    (2006.01)
*E21B 43/27*    (2006.01)

(52) U.S. Cl.
USPC .................. 166/252.5; 166/300; 166/305.1

(58) Field of Classification Search
USPC .................. 166/305.1, 252.5, 300
See application file for complete search history.

(56) References Cited

U.S. PATENT DOCUMENTS

| | | |
|---|---|---|
| 3,297,604 A | 1/1967 | Germino |
| 5,067,566 A | 11/1991 | Dawson |
| 5,098,836 A | 3/1992 | Stahl et al. |
| 5,126,051 A | 6/1992 | Shell et al. |
| 5,165,477 A | 11/1992 | Shell et al. |
| 5,201,370 A | 4/1993 | Tjon-Joe-Pin |
| 5,224,544 A | 7/1993 | Tjon-Joe-Pin |
| 5,226,479 A | 7/1993 | Gupta et al. |
| 5,247,995 A | 9/1993 | Tjon-Joe-Pin et al. |
| 5,421,409 A | 6/1995 | Mueller et al. |
| 5,547,026 A | 8/1996 | Brannon et al. |
| 5,562,160 A | 10/1996 | Brannon et al. |
| 5,566,759 A | 10/1996 | Tjon-Joe-Pin et al. |
| 5,806,597 A | 9/1998 | Tjon-Joe-Pin |
| 5,881,813 A | 3/1999 | Brannon et al. |
| 6,022,717 A * | 2/2000 | Brady et al. .................. 435/101 |
| 6,110,875 A | 8/2000 | Tjon-Joe-Pin et al. |
| 6,138,760 A | 10/2000 | Lopez et al. |
| 6,186,235 B1 | 2/2001 | Tjon-Joe-Pin et al. |
| 7,231,976 B2 | 6/2007 | Berry et al. |
| 7,347,265 B2 | 3/2008 | Monroe et al. |
| 7,392,844 B2 | 7/2008 | Berry et al. |
| 7,481,273 B2 | 1/2009 | Javora et al. |
| 7,851,416 B2 * | 12/2010 | Melbouci et al. ............. 507/217 |
| 2002/0076769 A1 * | 6/2002 | Brady et al. .................. 435/101 |

(Continued)

FOREIGN PATENT DOCUMENTS

CA    2579970 A1    8/2008

OTHER PUBLICATIONS

Silverman, The Organic Chemistry of Enzyme-Catalyzed Reactions, 2000, pp. 121-123, Academic Press, San Diego, California.

(Continued)

*Primary Examiner* — Angela M DiTrani
*Assistant Examiner* — Catherine Loikith
(74) *Attorney, Agent, or Firm* — John Wilson Jones; Jones & Smith, LLP

(57) ABSTRACT

A hydrocarbon-bearing subterranean formation may be treated with an aqueous well treatment fluid which contains a hexose oxidase, such as glucose oxidase, mannose oxidase or galactose oxidase. The aqueous well treatment fluid further may contain a viscosifying polymer and an aldohexose. The aldohexose reacts in-situ with the hexose oxidase and molecular oxygen to produce hydrogen peroxide. The hydrogen peroxide may then act as a breaker.

39 Claims, 1 Drawing Sheet

(56) References Cited

U.S. PATENT DOCUMENTS

| | | | |
|---|---|---|---|
| 2003/0045708 A1 | 3/2003 | Magallanes | |
| 2005/0272612 A1 | 12/2005 | Dawson et al. | |
| 2006/0105917 A1 | 5/2006 | Munoz | |
| 2007/0111896 A1* | 5/2007 | Knox et al. | 507/209 |
| 2007/0270316 A1 | 11/2007 | El Shaari et al. | |
| 2007/0275862 A1 | 11/2007 | Melbouci et al. | |
| 2010/0204069 A1 | 8/2010 | Le et al. | |
| 2011/0146996 A1 | 6/2011 | Bell et al. | |

OTHER PUBLICATIONS

SIGMA, Glucose Oxidase Type VII from Aspergillus Niger, Product Information Sheet, Sigma, Saint Louis, Missouri.

SIGMA, Glucose (GO) Assay Kit, Product Information Sheet, Technical Bulletin, Sigma, Saint Louis, Missouri.

C.D. Armstrong, et al., The Next Generation of Regenerative Catalytic Breakers for Use in Alkaline and High-Temperature Fracturing Fluids; SPE 127936 (2010).

* cited by examiner

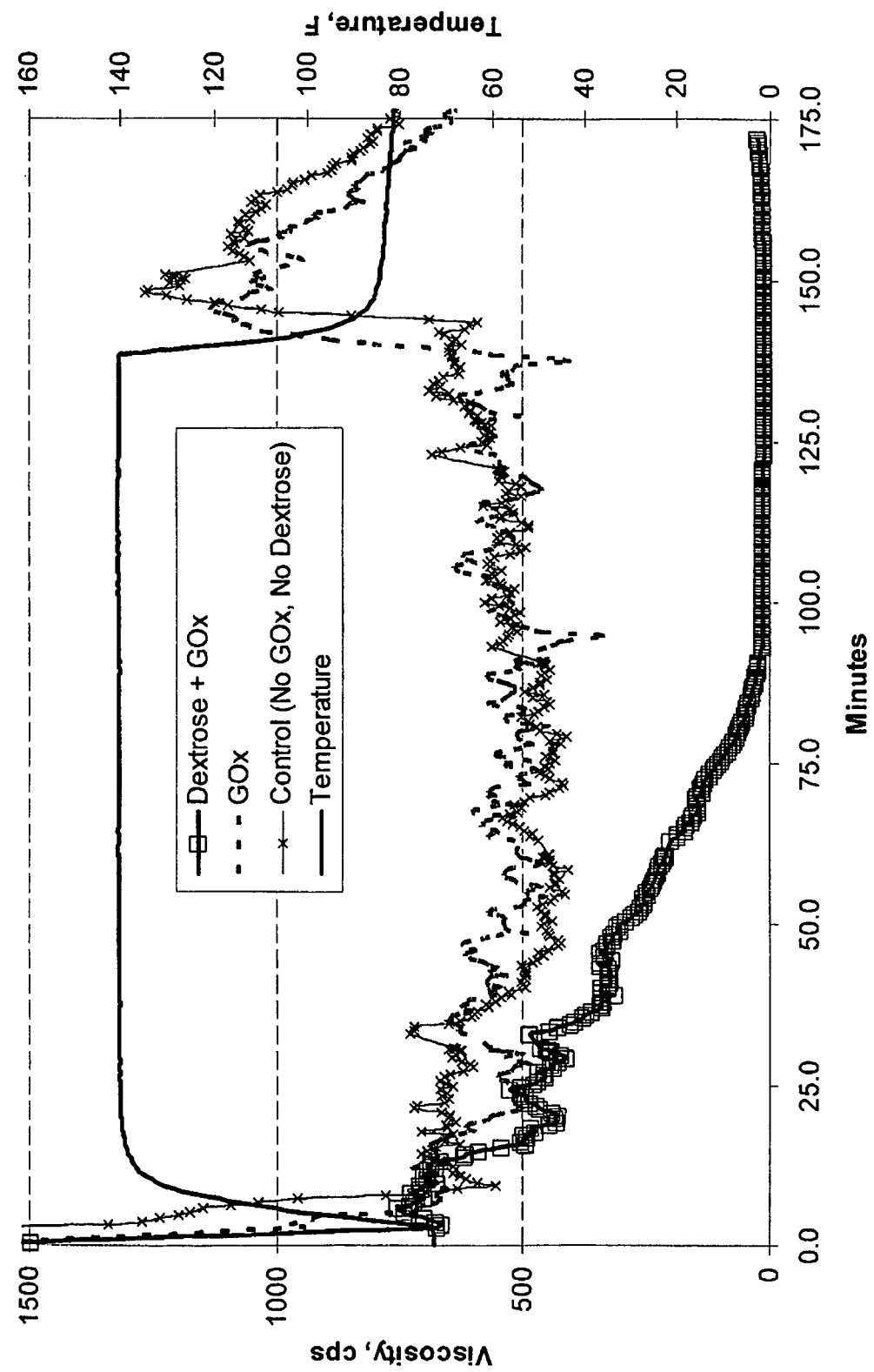

METHOD OF USING HEXOSE OXIDASES TO CREATE HYDROGEN PEROXIDE IN AQUEOUS WELL TREATMENT FLUIDS

FIELD OF THE INVENTION

Hexose oxidases are used for the in-situ creation of hydrogen peroxide, as breaker, for well treatment fluids. The breaker is produced in the presence of an aldohexose, such as glucose, galactose or mannose. The aldohexose is either a component of the well treatment fluid or is generated in-situ.

BACKGROUND OF THE INVENTION

Hydraulic fracturing is used to create subterranean fractures that extend from the borehole into the rock in order to increase the rate at which fluids can be produced from the formation. Generally, a fracturing fluid is pumped into the well at high pressure. Once natural reservoir pressures are exceeded, the fracturing fluid initiates a fracture in the formation which continues to grow during pumping. The treatment design generally requires the fluid to reach maximum viscosity as it enters the fracture.

The fracturing fluid typically contains a proppant which is placed within the produced fracture. The proppant remains in the produced fracture to prevent the complete closure of the fracture and to form a conductive channel extending from the wellbore into the treated formation.

Most fracturing fluids contain a viscosifying agent in order to increase the capability of proppant transport into the fracture. Suitable viscosifying agents include synthetic polymers, like polyvinyl alcohols, polyacrylates, polypyrrolidones and polyacrylamides, and polysaccharides, like guar gum (galactomannans) and guar gum derivatives. Exemplary guar or guar gum derivatives include hydroxypropyl guar (HPG), carboxymethyl guar (CMG) and carboxymethylhydroxypropyl guar (CMHPG) as well as high molecular weight non-derivatized guar.

Once the high viscosity fracturing fluid has carried the proppant into the formation, breakers are used to reduce the fluid's viscosity. In addition to facilitating settling of the proppant in the fracture, the breaker also facilitates fluid flowback to the well. Breakers work by reducing the molecular weight of the viscosifying agent. The fracture then becomes a high permeability conduit for fluids and gas to be produced back to the well.

Common breakers for use in fracturing fluids include chemical oxidizers, such as hydrogen peroxide and persulfates. Chemical oxidizers produce a radical which then degrades the viscosifying agent. This reaction is limited by the fact that oxidizers work in a stoichiometric fashion such that the oxidizer is consumed when one molecule of oxidizer breaks one chemical bond of the viscosifying agent. Further, at low temperatures, such as below 120° F., chemical oxidizers are generally too slow to be effective and other catalysts are needed to speed the rate of reaction. At higher temperatures, chemical oxidizers function very rapidly and often must be encapsulated in order to slow the rate of reaction. Alternatives have been sought for maximizing the efficiency of chemical oxidizers in the well treatment fluid at in-situ conditions.

More recent interest in hydraulic fracturing has focused on slickwater fracturing which is often used in the stimulation of tight gas reservoirs. In slickwater fracturing, a well is stimulated by pumping water at high rates into the wellbore, thereby creating a fracture in the productive formation. Slickwater fluids are basically fresh water or brine having sufficient friction reducing agent(s) to minimize tubular friction pressures. Generally, such fluids have viscosities only slightly higher than unadulterated fresh water or brine. Such fluids are much cheaper than conventional fracturing fluids which contain a viscosifying agent. In addition, the characteristic low viscosity of such fluids facilitates reduced fracture height growth in the reservoir during stimulation.

When aqueous fluids (like slickwater fracturing fluids) not containing a viscosifying polymer are used in stimulation, the pressure during the pumping stage is normally lower than that required in fracturing treatments using viscosifying polymers. The frictional drag of the frac fluid is lowered by the presence of the friction reduction agent(s) in the slickwater fluid. While slickwater fluids introduce less damage into the formation in light of the absence of viscosifying polymers, the friction reduction agent, if left in the formation, can cause formation damage. Effective means of degrading friction reduction agents in slickwater fracturing fluids is desired in order to minimize damage to the treated formation.

SUMMARY OF THE INVENTION

A hydrocarbon-bearing subterranean formation may be treated with an aqueous well treatment fluid containing a hexose oxidase. Hydrogen peroxide is generated in-situ by reaction of an aldohexose and oxygen in the presence of the hexose oxidase. The hydrogen peroxide may act as chemical breaker in the hydrolysis of a viscosifying polymer present in the well treatment fluid. Alternatively, the hydrogen peroxide may function to degrade a friction reduction agent in a well treatment fluid. Further, the hydrogen peroxide may function to degrade a polymeric component of a filter cake.

The aldohexose may be a component in the aqueous well treatment fluid. Alternatively, the aldohexose may be generated in-situ.

The aldohexose seeds the reaction for the generation of a small amount of hydrogen peroxide. The hydrogen peroxide produced from the seed reaction breaks at least a portion of the viscosifying polymer, friction reduction agent or the polymeric component of the filter cake which then reacts with oxygen, in the presence of the hexose oxidase, to create greater quantities of hydrogen peroxide. Thus, as the polysaccharide viscosifying agent or polysaccharide-based filter cake degrades, more and more breaker is produced. This then serves to effectuate the complete degradation of the polysaccharide viscosifying agent or polysaccharide-based filter cake. As such, the polysaccharide viscosifying agent or polysaccharide-based filter cake becomes the source of the breaker.

As an example, hydrogen peroxide produced from the seed reaction of aldohexose may break a small portion of a polysaccharide (functioning as viscosifying polymer) in a well treatment fluid into monosaccharide units. The monosaccharide units then react with oxygen, in the presence of the hexose oxidase, to create greater quantities of hydrogen peroxide. Degradation of the polysaccharide produces greater quantities of breaker which effectuates the complete degradation of the polysaccharide.

Exemplary of the invention is an aqueous well treatment fluid containing guar, beta D-glucose and glucose oxidase, a flavin-dependent enzyme. Reaction of the glucose with oxygen in the presence of the enzyme produces hydrogen peroxide and D-glucono-1,5-lactone. Other beta-D-monosaccharides, such as galactose and mannose, may also be converted to lactones by glucose oxidase. As hydrogen peroxide is produced, it attacks the guar and degrades guar to produce smaller molecular weight fragments including the monosaccharides galactose and mannose. The enzyme can then use these liberated monosaccharides to produce more hydrogen peroxide which further degrades the guar polymer.

In addition to the embodiment wherein the well treatment fluid is a fracturing fluid containing a viscosifying agent, the well treatment fluid may further be a fracturing fluid containing a polymeric friction reducer for use in slickwater fracturing. When used as a slickwater fracturing fluid, the hydrogen peroxide breaks the polymeric friction reducer. In the manner described above, the hydrogen peroxide is generated in situ by reaction of an aldohexose and oxygen in the presence of an aldohexose.

In addition, the well treatment fluid may be used to clean up a fluid loss pill, typically used during completion of the well. In such an instance, the well treatment fluid aids in the removal of the filter cake formed by the fluid loss pill. In addition, the well treatment fluid may be used to remove the filter cake from drilling fluid or drill-in fluid formed during drilling.

BRIEF DESCRIPTION OF THE DRAWINGS

In order to more fully understand the drawings referred to in the detailed description of the present invention, a brief description of each drawing is presented, in which:

The FIGURE demonstrates the reduction in viscosity of an aqueous fluid containing a crosslinked polysaccharide by the action of glucose oxidase when seeded with a hexoaldose.

DETAILED DESCRIPTION OF THE PREFERRED EMBODIMENTS

The method disclosed herein consists of treating a hydrocarbon-bearing subterranean formation penetrated by a wellbore with an aqueous well treatment fluid which contains a hexose oxidase. The hexose oxidase in the aqueous well treatment fluid of the invention is preferably glucose oxidase, mannose oxidase or galactose oxidase. Typically, the amount of hexose oxidase in the aqueous well treatment fluid is typically between from about $1.0 \times 10^{-3}$ to about 1.0 percent by volume.

The aqueous well treatment fluid may further contain a viscosifying agent. The viscosifying agent serves to increase the viscosity of the aqueous well treatment fluid and is hydrolyzed by the enzymatically produced hydrogen peroxide. When present, the amount of viscosifying agent in the aqueous well treatment fluid is between from about 0.10% to 5.0% by weight of the aqueous fluid. The most preferred range for the present invention is about 0.20% to 0.80% by weight.

Preferred viscosifying agents include polysaccharides which may be hydrolyzed by the enzymatically produced hydrogen peroxide to form monosaccharide units and other low molecular weight fragments. Suitable polysaccharides may be ionic as well as nonionic. Preferred are cellulose, starch, and galactomannan gums, such as non-derivatized and derivatized guar. The polysaccharide may be a microbial polysaccharide such as xanthan, succinoglycan and scleroglucan.

Suitable cellulose and cellulose derivatives include alkylcellulose, hydroxyalkyl cellulose or alkylhydroxyalkyl cellulose, carboxyalkyl cellulose derivatives such as methyl cellulose, hydroxyethyl cellulose, hydroxypropyl cellulose, hydroxybutyl cellulose, hydroxyethylmethyl cellulose, hydroxypropylmethyl cellulose, hydroxylbutylmethyl cellulose, methylhydroxyethyl cellulose, methylhydroxypropyl cellulose, ethylhydroxyethyl cellulose, carboxyethylcellulose, carboxymethylcellulose and carboxymethylhydroxyethyl cellulose.

Specific galactomannan gums and derivatized galactomannan gums include guar gum, hydroxypropyl guar, carboxymethyl guar, hydroxyethyl guar, hydroxypropyl guar, carboxymethylhydroxyethyl guar, carboxymethylhydroxypropyl guar and known derivatives of these gums.

Particularly preferred are "GW4" (guar), "GW21" (HEC), "GW22" (xanthan gum), "GW24L" (HEC slurry), "GW45" (CMG), "GW27" (guar), "GW28" (CMHEC), "GW32" (HPG), and "GW38" (CMHPG), all available from Baker Hughes Incorporated. In addition, slurried counterparts of these polymers are available from Baker Hughes Incorporated as "XLFC1" (guar), "XLFC1B" (guar), "XLFC2" (HPG), "XLFC2B" (HPG), "XLFC3" (CMPHG) "XLFC3B" (CMHPG), "VSP1" (CMG), and "VSP2" (CMG), respectively.

The viscosifying agent may further be a synthetic polymer such as a polyvinyl alcohol, polyacrylate, polypyrrolidone or polyacrylamide or a mixture thereof. In addition, the viscosifying polymer may be a block or random copolymer containing units selected from vinyl alcohol, acrylates, including the (meth)acrylates, pyrrolidone, 2-acrylamido-2-methylpropane sulfonate and acrylamide including the (meth)acrylamides.

The pH of the well treatment fluid introduced into the wellbore is typically between from about 5.5 to about 10.5 and more typically is between from about 8.5 to about 10.5.

When the well treatment fluid introduced contains a viscosifying polymer, the fluid further typically contains a crosslinking agent. Any crosslinking agent capable of hydrogen bonding with the viscosifying polymer may be employed.

Suitable crosslinking agents include a borate ion releasing compound, an organometallic or organic complexed metal ion comprising at least one transition metal or alkaline earth metal ion as well as mixtures thereof. When present, the amount of crosslinking agent employed in the composition is typically between from about 0.001 percent to about 2 percent, preferably from about 0.005 percent to about 1.5 percent, and, most preferably, from about 0.01 percent to about 1.0 percent.

Borate ion releasing compounds which can be employed include, for example, any boron compound which will supply borate ions in the well treatment fluid, for example, boric acid, alkali metal borates such as sodium diborate, potassium tetraborate, sodium tetraborate (borax), pentaborates and the like and alkaline and zinc metal borates. Such borate ion releasing compounds are disclosed in U.S. Pat. Nos. 3,058,909 and 3,974,077 herein incorporated by reference. In addition, such borate ion releasing compounds include boric oxide (such as selected from $H_3BO_3$ and $B_2O_3$) and polymeric borate compounds. Such borate-releasers typically require a basic pH (e.g., 7.0 to 12) for crosslinking to occur. Suitable pH adjustment agents, such as soda ash, potassium hydroxide, sodium hydroxide and alkaline and alkali carbonates and bicarbonates, may be used to maintained the desired pH.

Further preferred crosslinking agents are organometallic and organic complexed metal compounds, which can supply zirconium IV ions such as, for example, zirconium lactate, zirconium lactate triethanolamine, zirconium carbonate, zirconium acetylacetonate and zirconium diisopropylamine lactate; as well as compounds that can supply titanium IV ions such as, for example, titanium ammonium lactate, titanium triethanolamine, and titanium acetylacetonate. Zr (IV) and Ti (IV) may further be added directly as ions or oxy ions into the composition.

The aqueous well treatment fluid is used principally to enhance the productivity of the formation. In a preferred embodiment, the well treatment fluid is used as a stimulation fluid, such as one used in hydraulic fracturing. The heightened viscosity of the fluid enables the transport of a proppant into the created fractures. Such proppants serve to prop open the created fractures such that the fracture provides larger flow channels through which an increased quantity of a hydrocarbon may flow. Productive capability of the well is therefore increased.

When present in the well treatment fluid, the aldohexose functions as a monosaccharide "seed" to commence generation of a small amount of hydrogen peroxide in-situ by it reaction with oxygen, in the presence of the hexose oxidase. Suitable aldohexoses include allose, altrose, glucose, mannose, gulose, idose, galactose and talose.

An exemplary catalytic pathway for glucose oxidase (as hexose oxidase) in the production of hydrogen peroxide in the presence of a polysaccharide is set forth below in Schematic (I) wherein the monosaccharides are represented by the open hexagons, the lactone is represented by the cross-hatched hexagon, and the produced carboxylic acid is represented by the filled hexagon:

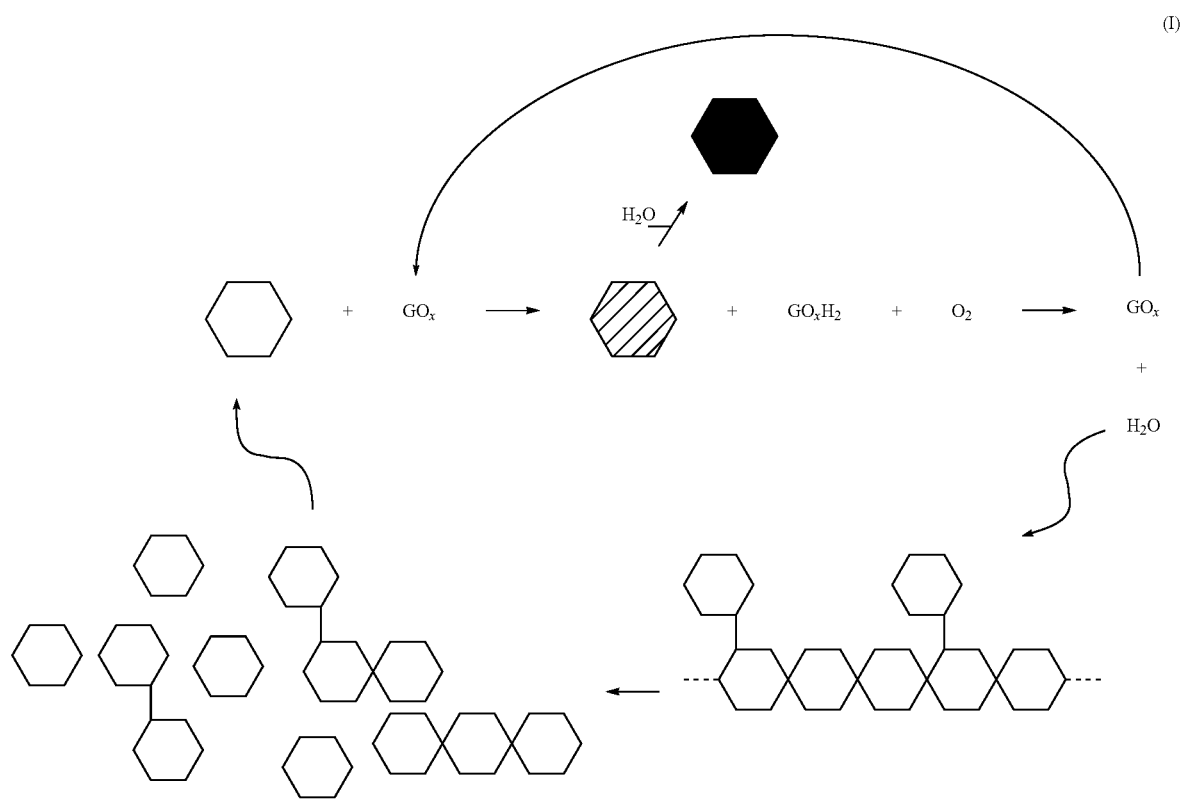

(I)

In addition to the hexose oxidase, the aqueous well treatment fluids described herein may further contain one or more aldohexoses. The aldohexose in the well treatment fluid reacts in-situ with the hexose oxidase and molecular oxygen (within the wellbore) to produce hydrogen peroxide and a lactone. When present, the amount of aldohexose in the aqueous well treatment fluid introduced into the wellbore is that sufficient to produce, in the presence of the hexose oxidase, a small amount of hydrogen peroxide. Typically, the amount of aldohexose in the aqueous well treatment fluid is no greater than 0.001 volume percent. The produced hydrogen peroxide may then be used to break down the viscosifying polymer (for example polysaccharide into monosaccharide units), friction reduction agent or polymeric component of a filter cake which in turn then produces additional hydrogen peroxide. In the case of breaking synthetic polymeric friction reducers, the amount of aldohexose in the aqueous well treatment fluid is that sufficient to produce the desired amount of hydrogen peroxide.

As illustrated, hydrogen peroxide produced from the seed reaction breaks a small portion of the polysaccharide (viscosifying polymer) into monosaccharide units. Such monosaccharide units then react with the hexose oxidase and oxygen to create greater quantities of hydrogen peroxide to defragment the polysaccharide. As such, the aldohexose in the aqueous well treatment fluid when introduced into the wellbore serves as a seed to generate a small amount of hydrogen peroxide; much larger amounts of hydrogen peroxide being produced in-situ as degradation of the polysaccharide continues in the formation.

Typically, the molar ratio of aldohexose to hexose oxidase in the aqueous well treatment fluid introduced into the wellbore to conduct the seed reaction is between from about 1:10 to about 10:1 and the molar ratio between the aldohexose, oxygen and hexose oxidase is preferably 1:1:1.

Instead of including the aldohexose in the aqueous well treatment fluid, the aldohexose may be generated in-situ. For instance, where the aqueous well treatment fluid introduced into the wellbore contains a polysaccharide as viscosifying agent, the fluid may further contain a small amount of a conventional enzyme breaker or chemical breaker, like peroxide. Such a breaker could defragment a small amount of polymeric viscosifying agent into monosaccharide units including aldohexose units. Such in-situ generated aldohexoses may then react with the hexose oxidase and molecular oxygen to produce hydrogen peroxide, such as in accordance with Schematic (I) above.

The generation of hydrogen peroxide in accordance with the method of the invention is believed to proceed by Schematic (II), wherein the aldohexose if glucose:

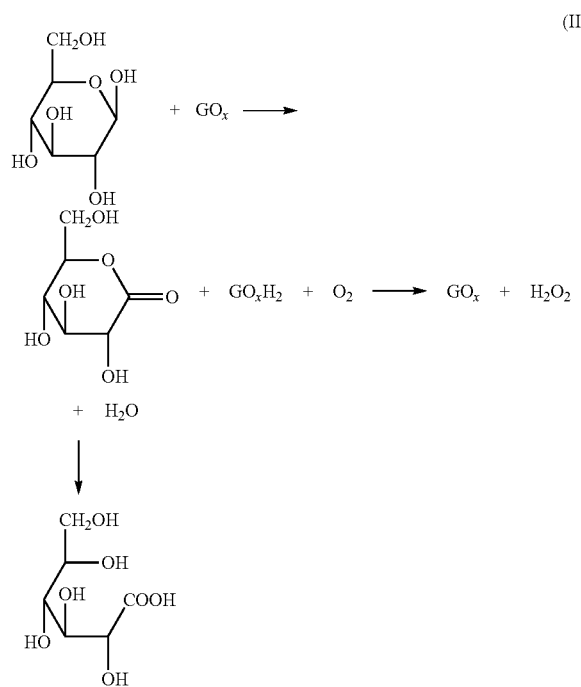

As shown, in the presence of glucose oxidase, $GO_x$, and oxygen (within the wellbore and/or formation), glucose is oxidized to its corresponding lactone which hydrolyzes to the corresponding carboxylic acid, a carboxylated derivative of the aldohexose. The reduced form of the glucose oxidase further reacts with oxygen to restore the glucose oxidase to its initial (oxidized) state and produce hydrogen peroxide. The hydrogen peroxide then degrades the viscosifying polymer, friction reduction agent or polymeric component of a filter cake into smaller building or molecular units which may then, in turn, react with the hexose oxidase to produce additional hydrogen peroxide by the procedure set forth above.

The viscosity of the well treatment fluid is thereby gradually decreased by the hydrogen peroxide produced in-situ in the formation from the reaction of the glucose oxidase and aldohexose. The pH is lowered as the carboxylic acid is generated. In, for example, a well treatment fluid containing a viscosifying polymer, the lowering of the pH diminishes the efficacy of the crosslinking agent to hydrogen bonding to the polysaccharide. The lowering of the pH decreases the viscosity of the well treatment fluid.

When used as a fracturing fluid, any proppant known in the art may be used in the well treatment fluid. Suitable proppants include quartz sand grains, glass and ceramic beads, walnut shell fragments, aluminum pellets and nylon pellets.

Other suitable proppants include ultra lightweight proppants having an apparent specific gravity less than or equal to 2.45, preferably less than or equal to 1.75, most preferably less than or equal to 1.25. Suitable ULW particulates include those set forth in U.S. Patent Publication No. 20050028979, published on Feb. 10, 2005, herein incorporated by reference. Included therein are naturally occurring materials which may be strengthened or hardened by use of modifying agents to increase the ability of the naturally occurring material to resist deformation. Specific examples of ULW particulates include, but are not limited to, ground or crushed shells of nuts such as walnut, coconut, pecan, almond, ivory nut, brazil nut, etc.; ground or crushed seed shells (including fruit pits) of seeds of fruits such as plum, olive, peach, cherry, apricot, etc.; ground or crushed seed shells of other plants such as maize (e.g., corn cobs or corn kernels), etc.; processed wood materials such as those derived from woods such as oak, hickory, walnut, poplar, mahogany, etc., including such woods that have been processed by grinding, chipping, or other form of particalization, processing, etc. Further suitable particulates include porous ceramics or organic polymeric particulates. The porous particulate material may be treated with a non-porous penetrating material, coating layer or glazing layer. For instance, the porous particulate material may be a treated particulate material, as defined in U.S. Pat. No. 7,426,961, herein incorporated by reference, wherein (a) the ASG of the treated porous material is less than the ASG of the porous particulate material; (b) the permeability of the treated material is less than the permeability of the porous particulate material; or (c) the porosity of the treated material is less than the porosity of the porous particulate material. Further, the ultra lightweight particulate may be a well treating aggregate composed of an organic lightweight material and a weight modifying agent. The ASG of the organic lightweight material is either greater than or less than the ASG of the well treating aggregate depending on if the weight modifying agent is a weighting agent or weight reducing agent, respectively. Where the weight modifying agent is a weighting agent, the ASG of the well treating aggregate is at least one and a half times the ASG of the organic lightweight material, the ASG of the well treating aggregate preferably being at least about 1.0, preferably at least about 1.25. Such ULW proppants are disclosed in U.S. Patent Publication No 2008/0087429 A1, herein incorporated by reference. Further, the ULW proppant may be a polyamide, such as those disclosed in US-2007-0209795 A1, herein incorporated by reference. Further, the ULW proppant may be metallic spheres, such as those disclosed in U.S. Patent Publication No. 2008/0179057 A1 as well as those deformable particulates set forth in U.S. Pat. No. 7,322,411, both of which are herein incorporated by reference. Still preferred are synthetic polymers, such as polystyrene beads crosslinked with divinylbenzene. Such beads include those described in U.S. Pat. No. 7,494,711, herein incorporated by reference.

The well treatment fluid described herein can also contain other conventional additives common to the well service industry such as surfactants, corrosion inhibitors, crosslinking delaying agents and the like.

In addition to functioning as a stimulation fluid, the aqueous well treatment fluids described herein may also be used as a well treatment fluid to clean up a fluid loss pill typically used during completion operations. In this case, the well treatment fluid aids in the removal of the filter cake formed by the fluid loss pill. The filter cake, in some instance, may become embedded in the formation. The treatment fluid for such purposes does not contain a viscosifying polymer, such as a polysaccharide. The treatment fluid contains hexose oxidase which reacts with an aldohexose (either in the treatment fluid or generated in-situ) to produce hydrogen peroxide. The hydrogen peroxide is then used to break down the polymeric component, such as a polysaccharide, in the filter cake in the manner described above. The well treatment fluid therefore assists in the removal of the filter cake defragmenting the polymeric component present in the filter cake.

Similarly, the aqueous well treatment fluids described herein may also be used as a well treatment fluid to remove the filter cake from drilling fluid or drill-in fluid formed during drilling operations. In this case, the well treatment fluid aids in the removal of the filter cake formed by the drilling fluid or drill-in fluid being deposited directly against the formation. The filter cake, in some instance, may become embedded in the formation. Removal of the filter cake is effectuated by breaking down the polymeric component of the filter cake in the manner described above. In particular, the hexose oxidase, in conjunction with the hexoaldose and oxygen, generates hydrogen peroxide. The peroxide, in turn, defragments the polymeric component and breaks the filter cake.

In another preferred embodiment, the well treatment fluid described herein is a fracturing fluid for slickwater fracturing. The aqueous well treatment fluid for slickwater fracturing typically does not contain a viscosifying agent such as a viscosifying polymer. Instead, the well treatment fluid contains a polymeric friction reducing agent. The hydrogen peroxide generated in-situ from the reaction of the aldohexose and oxygen, in the presence of the hexose oxidase, reduces the molecular weight of the friction reducing agent. The defragmented components of the friction reducing agent may then be removed from the wellbore and formation damage from the friction reducing agent is thereby minimized. Typically, the friction reducing agent in such applications is a polyacrylamide and polyacrylates. The amount of friction reducing agents in such well treatment fluids is generally from about 1 to about 8 pounds per thousand gallons of water. Such slickwater fracturing methods are particularly desirous when stimulating shale formations and tight gas sands, as well as limestone.

The following examples are illustrative of some of the embodiments of the present invention. Other embodiments within the scope of the claims herein will be apparent to one skilled in the art from consideration of the description set forth herein. It is intended that the specification, together with the examples, be considered exemplary only, with the scope and spirit of the invention being indicated by the claims which follow.

EXAMPLES

Example 1. A 100 mL aqueous fluid was prepared containing 25 ppt of a non-derivatized guar having an intrinsic viscosity of approximately 16.1 dL/g (commercially available as GW3 from Baker Hughes Incorporated), 1.5 gpt of buffer (commercially available as BF-7L from Baker Hughes Incorporated), 1.5 gpt of a borate crosslinking agent (commercially available as XLW-32 from Baker Hughes Incorporated) and about 25 ug/mL of glucose oxidase, $GO_x$. Dextrose was then added at a concentration of approximately 3 μM. The resulting fluid was then transferred to a Chandler 5500 viscometer having an R1B1 bob and cup assembly. The viscosity was then measured at 300 rpm (511 $sec^{-1}$) at 140° F. The FIGURE demonstrates the reduction in viscosity of the crosslinked guar polymer by the action of glucose oxidase. As shown in the FIGURE, glucose oxidase reduces the viscosity of the 25 ppt crosslinked guar polymer when seeded with the 3 mM dextrose. Liberated mannose and galactose monosaccharides are used by the enzyme to produce hydrogen peroxide and further degrade the crosslinked guar polymer. In the absence of dextrose, the FIGURE shows that glucose oxidase does not initiate the reaction and the crosslinked guar polymer is not broken. The FIGURE also demonstrates that there is no significant rebounding of the viscosity of the broken guar polymer as compared to the control once the samples are cooled to room temperature.

Example 2

Approximately 5.5 mM of mannose, galactose and glucose were dissolved in three separate vessels containing distilled water and about 25 ug/mL of glucose oxidase. The concentration of hydrogen peroxide was then measured by test strips after 5 minutes and 1 hour and the pH of the fluid after one hour was also determined. The results are set forth in Table I below:

TABLE I

| Sugar | $[H_2O_2]^A$, mg/L | $[H_2O_2]^B$, mg/L | $pH^B$ |
|---|---|---|---|
| Mannose | 3 | 10 | 4.5 |
| Galactose | 0 | 3 | 5.7 |
| Glucose | 10 | 30 | 3.7 |

$^A$5 minute reaction time.
$^B$1 hour reaction time.

As shown in Table I, mannose and galactose as well as glucose are suitable substrates for glucose oxidase. Based on the concentration of hydrogen peroxide with respect to time, the enzyme's substrate specificity is glucose>mannose>galactose. This is also reflected in the pH of the samples after the 5 minute reaction time. Referring to Sequence II above, the production of a carboxylic acid from the oxidized lactone provides the recorded drop in the pH of the fluid. The pH of each of the samples is consistent with the utilization of the substrate i.e. the more the reaction progresses, the lower the pH. Additionally, the drop in pH reduces the efficacy of the crosslinking reaction leading to a further reduction in the viscosity of the fluid.

From the foregoing, it will be observed that numerous variations and modifications may be effected without departing from the true spirit and scope of the novel concepts of the invention.

What is claimed is:

1. A method of treating a subterranean formation penetrated by a wellbore which comprises:
    (a) introducing into the wellbore an aqueous well treatment fluid comprising a polysaccharide viscosifying agent and a hexose oxidase and increasing the viscosity of the well treatment fluid in-situ;
    (b) producing hydrogen peroxide in-situ by activating the hexose oxidase with an aldohexose to produce a lactone and then reacting the lactone with oxygen, in the presence of the activated hexose oxidase;
    (c) reducing the viscosity of the well treatment fluid by reacting the hydrogen peroxide with the viscosifying agent.

2. The method of claim 1, wherein the aldohexose of claim (b) is generated in-situ.

3. The method of claim 2, wherein the aldohexose is produced in-situ by reacting the polysaccharide viscosifying agent with an enzyme or hydrogen peroxide.

4. The method of claim 1, wherein the aqueous well treatment fluid introduced into the wellbore further contains an aldohexose.

5. The method of claim 1, wherein the aldohexose is selected from the group consisting of allose, altrose, glucose, mannose, gulose, idose, galactose and talose.

6. The method of claim 5, wherein the aldohexose is selected from the group consisting of glucose, mannose and galactose.

7. The method of claim 1, wherein the hexose oxidase is selected from the group consisting of glucose oxidase, mannose oxidase and galactose oxidase.

8. The method of claim 7, wherein the hexose oxidase is glucose oxidase.

9. The method of claim 1, wherein the polysaccharide viscosifying agent is selected from the group consisting of cellulosic derivatives, galactomannan or a galactomannan derivative, xanthan, succinoglycan and scleroglucan.

10. The method of claim 9, wherein the polysaccharide viscosifying agent is a cellulosic derivative selected from the group consisting of hydroxyalkyl celluloses, alkylcarboxyhydroxy celluloses and carboxyalkyl cellulose derivatives.

11. The method of claim 10, wherein the cellulosic derivative is selected from the group consisting of hydroxyethyl cellulose, methylhydroxyethyl cellulose, ethylhydroxyethyl cellulose, carboxymethylhydroxyethyl cellulose and methylhydroxypropyl cellulose.

12. The method of claim 9, wherein the polysaccharide viscosifying agent is selected from the group consisting of guar gum, hydroxypropylguar, carboxymethylguar, carboxymethylhydroxypropylguar, xanthan gum and scleroglucan.

13. The method of claim 9, wherein the galactomannan or galactomannan derivative is guar or a guar derivative.

14. The method of claim 1, wherein the molar ratio of aldohexose:hexose oxidase in step (b) is between from about 1:10 to about 10:1.

15. The method of claim 1, wherein the molar ratio between the aldohexose, oxygen and hexose oxidase in step (b) is 1:1:1.

16. The method of claim 1, wherein the pH of the well treatment fluid introduced into the wellbore is between from about 5.5 to about 10.5.

17. The method of claim 1, wherein the well treatment fluid introduced into the wellbore further comprises a crosslinking agent.

18. The method of claim 1 wherein the well treatment fluid is a fracturing fluid.

19. A method of treating a subterranean formation penetrated by a wellbore which comprises:
(a) introducing into the wellbore an aqueous well treatment fluid having a pH between from about 5.5 to about 10.5, the aqueous well treatment fluid comprising a polysaccharide viscosifying agent, a crosslinking agent, an aldohexose and a hexose oxidase;
(b) oxidizing the aldohexose with oxygen in the presence of the hexose oxidase to produce a lactone and reducing the hexose oxidase;
(c) reacting the reduced hexose oxidase with oxygen to generate hydrogen peroxide;
(d) lowering the pH of the well treatment fluid with the carboxylated derivative of the aldohexose hydrolyzed from the lactone; and
(e) degrading the polysaccharide viscosifying agent by reacting the hydrogen peroxide generated in step (b) with the polysaccharide viscosifying agent.

20. The method of claim 19, wherein the molar ratio of aldohexose:hexose oxidase in the aqueous well treatment fluid is between from about 1:10 to about 10:1.

21. The method of claim 19, wherein the molar ratio of the aldohexose:oxygen:hexose oxidase in step (b) is 1:1:1.

22. The method of claim 19, wherein the polysaccharide viscosifying agent is a polysaccharide selected from the group consisting of guar and guar derivatives.

23. A method of treating a subterranean formation penetrated by a wellbore which comprises:
(a) introducing into the wellbore an aqueous well treatment fluid comprising a polysaccharide, a crosslinking agent capable of hydrogen bonding with the polysaccharide, a hexose oxidase and an aldohexose, the viscosity of the well treatment fluid increasing after introduction of the aqueous well treatment fluid into the wellbore;
(b) hydrolyzing the polysaccharide to form a monosaccharide;
(c) activating the hexose oxidase with the aldohexose to form a reduced form of the hexose oxidase while further forming, from the monosaccharide, a lactone;
(d) reacting the lactone with oxygen in the presence of the reduced form of the hexose oxidase and water to generate hydrogen peroxide and a carboxylic acid while restoring the hexose oxidase to its initial oxidized state;
(e) degrading the polysaccharide with the hydrogen peroxide produced in step (d);
(f) reducing the efficacy of the crosslinking agent to hydrogen bonding to the polymer by reducing the pH of the fracturing fluid with the generated carboxylic acid of step (d)
thereby lowering the viscosity of the well treatment fluid.

24. The method of claim 23, wherein the pH of the aqueous well treatment fluid introduced into the wellbore in step (a) is between from about 5.5 to about 10.5.

25. The method of claim 23, wherein the polysaccharide is guar or a guar derivative.

26. The method of claim 23, wherein the aldohexose is selected from the group consisting of allose, altrose, glucose, mannose, gulose, idose, galactose and talose.

27. The method of claim 26, wherein the aldohexose is selected from the group consisting of glucose, mannose and galactose.

28. The method of claim 23, wherein the hexose oxidase is selected from the group consisting of glucose oxidase, mannose oxidase and galactose oxidase.

29. The method of claim 28, wherein the hexose oxidase is glucose oxidase.

30. A method of treating a subterranean formation penetrated by a wellbore which comprises:
(a) introducing into the wellbore an aqueous viscous well treatment fluid comprising guar or a guar derivative; a crosslinking agent, a hexose oxidase and an aldohexose seed, wherein guar or guar derivative hydrolyzes to a monosaccharide after being introduced into the wellbore;
(b) activating the hexose oxidase with the aldohexose seed and producing a lactone from the monosaccharide;
(c) reacting the lactone with oxygen in the presence of the activated hexose oxidase to generate hydrogen peroxide; and
(d) degrading the guar or guar derivative with the hydrogen peroxide.

31. The method of claim 30, wherein the aqueous viscous well treatment fluid introduced into the wellbore is a fracturing fluid.

32. A method of slickwater fracturing a subterranean formation penetrated by a wellbore comprising:
(a) introducing into the wellbore an aqueous well treatment fluid void of a viscosifying polymer, wherein the well treatment fluid comprises a polymeric friction reducing agent, a hexose oxidase and an aldohexose;
(b) producing hydrogen peroxide in-situ by reacting an aldohexose and oxygen, in the presence of the hexose oxidase,
(c) reducing the viscosity of the well treatment fluid by reacting the hydrogen peroxide with the polymeric friction reducing agent.

33. A method of treating a subterranean formation penetrated by a wellbore which comprises:
(a) forming a filter cake within the wellbore containing a polysaccharide viscosifying agent;
(b) introducing into the wellbore a well treatment fluid comprising hexose oxidase;
(c) activating the hexose oxidase with aldohexose;
(d) hydrolyzing the polysaccharide viscosifying agent to a monosaccharide and producing a lactone from the monosaccharide;
(e) reacting the lactone with oxygen in the presence of the activated hexose oxidase to generate hydrogen peroxide; and
(f) degrading the polysaccharide in the filter cake with the hydrogen peroxide.

34. The method of claim 33, wherein the monosaccharide formed in step (d) is selected from the group consisting of allose, altrose, glucose, mannose, gulose, idose, galactose and talose.

35. The method of claim 33, wherein the hexose oxidase is selected from the group consisting of glucose oxidase, mannose oxidase and galactose oxidase.

36. The method of claim 35, wherein the hexose oxidase is glucose oxidase.

37. The method of claim 33, wherein the aldohexose is a component of the treatment fluid or is generated in-situ.

38. A method of increasing the flow of production fluids from a subterranean formation penetrated by a wellbore by removing a filter cake within the subterranean formation, the method comprising:
(a) activating hexose oxidase in-situ with an aldohexose;
(b) hydrolyzing polysaccharide within the filter cake to a monosaccharide and producing a lactone from the monosaccharide;
(c) reacting the lactone with oxygen in the presence of the activated hexose oxidase to generate hydrogen peroxide; and
(d) degrading the polysaccharide in the filter cake with the hydrogen peroxide.

39. The method of claim 38, wherein the aldohexose is selected from the group consisting of allose, altrose, glucose, mannose, gulose, idose, galactose and talose.

* * * * *